(12) United States Patent
Fredlund et al.

(10) Patent No.: US 8,756,114 B2
(45) Date of Patent: Jun. 17, 2014

(54) METHOD, MEDIUM, AND SYSTEM FOR GENERATING OFFERS FOR IMAGE BEARING PRODUCTS

(75) Inventors: John R. Fredlund, Rochester, NY (US); Dale F. McIntyre, Honeoye Falls, NY (US)

(73) Assignee: Intellectual Ventures Fund 83 LLC, Las Vegas, NV (US)

( * ) Notice: Subject to any disclaimer, the term of this patent is extended or adjusted under 35 U.S.C. 154(b) by 178 days.

(21) Appl. No.: 11/758,331

(22) Filed: Jun. 5, 2007

(65) Prior Publication Data

US 2008/0306749 A1 Dec. 11, 2008

(51) Int. Cl.
*G06Q 30/00* (2012.01)

(52) U.S. Cl.
USPC ........................................ 705/26.5

(58) Field of Classification Search
USPC .................. 705/26, 27, 26.1, 27.1, 27.2, 26.5
See application file for complete search history.

(56) References Cited

U.S. PATENT DOCUMENTS

| | | | |
|---|---|---|---|
| 6,157,435 A * | 12/2000 | Slater et al. ..................... | 355/40 |
| 6,414,693 B1 | 7/2002 | Berger et al. | |
| 2001/0049661 A1 | 12/2001 | Power et al. | |
| 2002/0069119 A1 * | 6/2002 | Rogatinsky ..................... | 705/26 |
| 2003/0065590 A1 * | 4/2003 | Haeberli ......................... | 705/27 |
| 2004/0165218 A1 | 8/2004 | Fredlund et al. | |
| 2004/0172325 A1 * | 9/2004 | Blanco et al. .................... | 705/14 |
| 2005/0018216 A1 * | 1/2005 | Barsness et al. ............... | 358/1.6 |
| 2005/0192873 A1 * | 9/2005 | Roche et al. .................... | 705/27 |
| 2005/0210413 A1 * | 9/2005 | Quek et al. ..................... | 715/838 |
| 2005/0246336 A1 | 11/2005 | Stauder et al. | |
| 2006/0184425 A1 | 8/2006 | Hanechak et al. | |
| 2008/0306749 A1 * | 12/2008 | Fredlund et al. .................. | 705/1 |

OTHER PUBLICATIONS

Oct. 2004—http://www.kis-kiosk.com/public/archives/000024.html.*
International Preliminary Report on patentability for PCT/US2008/006999, issued Dec. 7, 2009.
International Search Report and Written Opinion on PCT/US2008/006999, mailed Jun. 9, 2009.
Supplemental European Search Report on EP 08768086, completed Mar. 28, 2012.

* cited by examiner

*Primary Examiner* — Matthew Zimmerman (57) ABSTRACT

A method of presenting n offer of an image-bearing product to a user provides access to a plurality of user image files. User image files are analyzed to obtain semantic information about the content of the plurality of image files. An offer for the image-bearing product based on the semantic information obtained, wherein the product uses at least one image from the plurality of image files. The offer is transmitted to the user.

20 Claims, 5 Drawing Sheets

METHOD, MEDIUM, AND SYSTEM FOR GENERATING OFFERS FOR IMAGE BEARING PRODUCTS

FIELD OF THE INVENTION

The present invention relates generally to online marketing of image-related materials and more particularly relates to a system and method for presenting image-bearing products to a consumer, customized with images of interest to the consumer.

BACKGROUND OF THE INVENTION

The rapid growth in digital imaging has brought about a number of improvements in the ways that consumers use images that they have obtained. Online imaging utilities, such as those provided by the Kodak EasyShare™ system allow the consumer to upload images for storage in an online gallery. These images can be accessed and used by the consumer and other individuals to whom the consumer has granted permission. Further, images from an online collection can be downloaded for printing or viewing or used, for example, in applications such as screensavers. Also, high-quality reprints, calendars, decorated coffee cups and similar items, mousepads, posters, T-shirts, and numerous other items using consumer's images can be ordered.

Online gallery storage presents a number of new opportunities for retailers. Targeted marketing based on consumers who use online image storage allows a retailer to present products that may have special appeal to an audience. More particularly, this audience has effectively been "pre-screened", that is, the consumers have already shown interest in an area by their selection and use of specific websites. Approaches to Customer Relationship Management (CRM) have the goal of successfully using information profiles on consumers in order to more effectively present to them goods and services they are likely to buy. Advantageously, based on considerable data obtained on a consumer from various activity at one or more internet sites, strategic use of CRM allows the retailer to customize selling approaches to each consumer, presenting information on goods and services that can be specifically tailored to each consumer account.

While CRM methods have been applied to various online merchandising applications, the primary emphasis has been on profiling the consumer and offering product packages that are likely to be of interest based on this profile information. However, semantic understanding of the content of consumer images, or pertaining to the consumer images, has not been used to generate personalized products for the consumer.

SUMMARY OF THE INVENTION

In general terms, the present invention is a system and method for online marketing of image-related materials and more particularly to a system and method for presenting image-bearing products to a consumer, customized with images of interest to the consumer.

One aspect of the present invention includes a method of presenting an offer of an image-bearing product to a user. More particularly, the method includes providing access to a plurality of user image files, analyzing the plurality of user image files to obtain semantic information about the content of the plurality of user image files, generating an offer for an image-bearing product based on the semantic information obtained, wherein the product uses at least one image from the plurality of user image files, and transmitting the offer to the user.

Another aspect of the present invention is a method for presenting an image bearing product offer to a user. More particularly, the method includes providing access to metadata associated with a plurality of user image files, analyzing the metadata for determining the relevance of at least one product offer, and providing the at least one product offer based on the determined relevance, the product offer using one or more of the plurality of user image files.

Another aspect of the present invention is a system for presenting an offer of an image-bearing product to a user. More particularly, the system includes a device for allowing access to a plurality of user image files, and a third party for analyzing the plurality of user image files to obtain semantic information about the content of the plurality of image files, generating an offer for the image-bearing product based on the semantic information obtained, wherein the product uses at least one image from the plurality of image files, and transmitting the offer to a user.

DETAILED DESCRIPTION OF THE INVENTION

Various embodiments of the present invention will be described in detail with reference to the drawings, wherein like reference numerals represent like parts and assemblies throughout the several views. Reference to various embodiments does not limit the scope of the invention, which is limited only by the scope of the claims attached hereto. Additionally, any examples set forth in this specification are not intended to be limiting and merely set forth some of the many possible embodiments for the claimed invention.

The present invention provides a system and method for generating and presenting personalized image-bearing products to a consumer. Using the method of the present invention, providers of products that use consumer images can automatically generate one or more products, personalized for a consumer, and present the product(s) to the consumer for possible purchase. Images used for the generated products can be obtained either from still or video images.

A range of possible image-bearing products customized with images from the user's image collection can be presented to the user by vendors. For example, products can include reprints, calendars, decorated coffee cups and similar items, mousepads, posters, T-shirts, and numerous other items that are generated and shipped to the consumer, each type of product including an image from the consumer's collection. Products could also include soft-copy products, such as presentations, animations, gag image gifts of the consumer appearing with celebrities, and images for download, display or printing.

Figure 1:
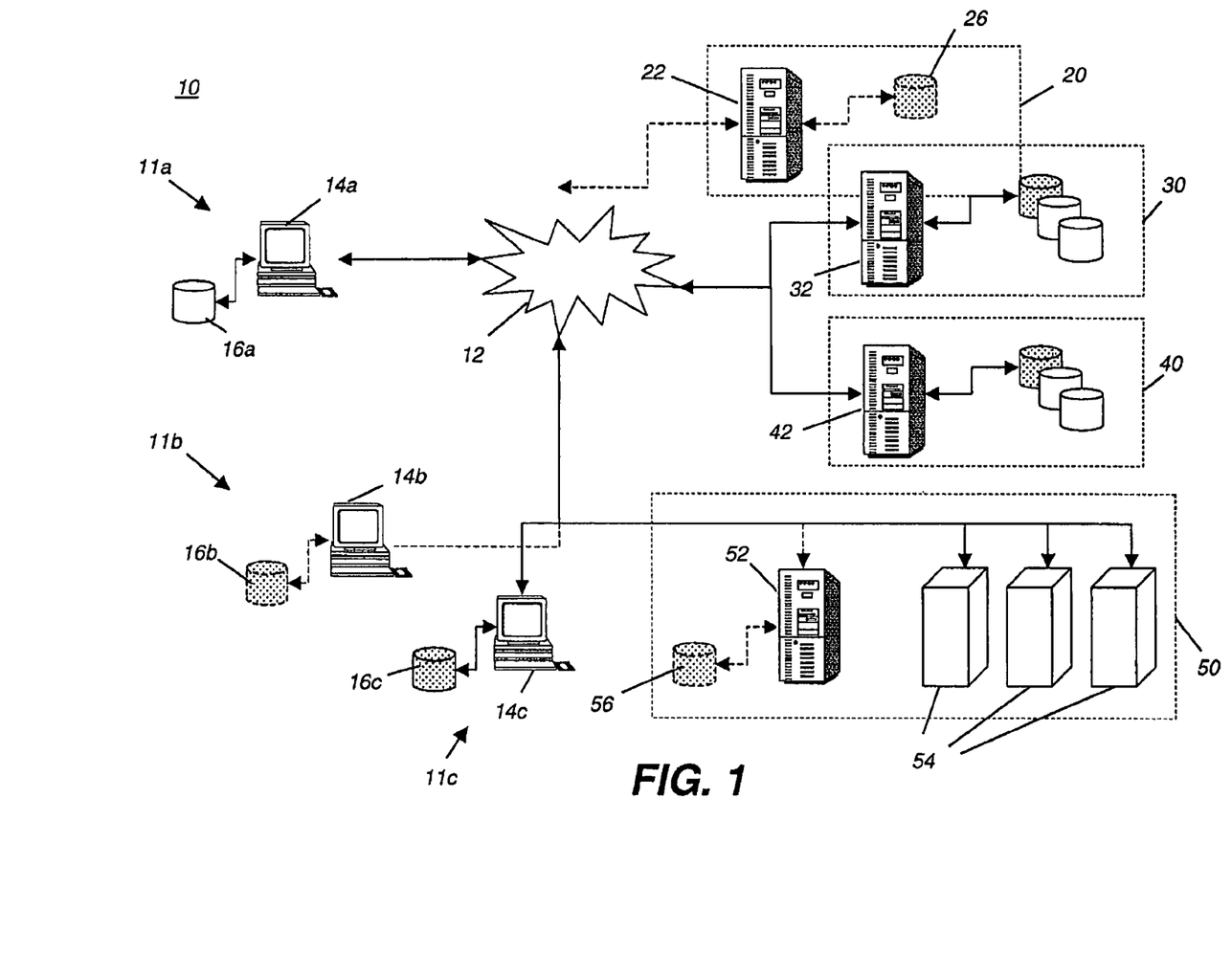
FIG. 1 illustrates a retail system for intelligent on-line marketing that facilitates the generation of products and sales for vendors of image-bearing products.

FIG. 1 illustrates a retail system 10 for intelligent on-line marketing that facilitates the generation of products and sales for vendors of image-bearing products. Retail system 10 uses a network 12, such as the Internet, although, more generally, other network applications that link multiple sites could be used. In retail system 10, a number of consumer sites 11a, 11b, 11c having user computers 14a, 14b, and 14c are shown. Each computer 14a-14c at a consumer site 11a, 11b, 11c can have a local database 16a, 16b, 16c that includes personal content that may be of interest and accessible to other users. There are a number of server sites 20, 30, 40, and 50, each having a corresponding server 22, 32, 42, and 52 respectively.

At server site 20, server 22 stores metadata on various consumers in a database 26. This stored metadata does not need to include images. This metadata can include information or profiles of a number of consumer accounts, information that can be made available to third parties. Server site 30 has a server 32 that acts as an online asset provider for storing third-party content. Server site 40 has a server 42 that acts as an online service provider for content of interest to one or more consumers. Server site 50 has an application host server 52 that serves a number of applications from application providers 54 and includes a rules database 56 for storing rules and associated data for providing products, as described subsequently.

In retail system 10, participating consumers each have an organized collection of images that are stored or managed in cooperation with a primary picture service provider (PSP). Access to user files is provided to the PSP as well as to one or more services or application providers 54 who also have some relationship to the PSP. Also, access to user files is provided to vendors of various image-bearing products that can be customized for each user. This access can be limited to semantic information about the consumer image files, low-resolution images and for semantic information about the images. Optionally, access to high-resolution images may be available. For example, server 52 at server site 50 can provide access to a consumer collection of images stored in database 56 to third parties, i.e., application providers 54.

In one embodiment, server 42 includes image analysis tools that are capable of obtaining semantic information about the images. Semantic information can include any description of the objects, people, places, events, and other discernable features that are stored with the image or can be obtained from image content. For example, semantic information about a still image can include data on the subject (a child, a flower, dog or other animal, sports figures in motion, etc.), conditions under which the image was obtained (indoors or outdoors, location coordinates), type of camera (portraiture, high- or low-end consumer, etc.), identity of the camera owner, and other data. Techniques for identifying the subject of an image and obtaining other data on image capture conditions are well known to those skilled in the imaging arts. Semantic data may be provided directly from the consumer when images are captured or stored, for example, by entering a title or theme information on a camera touchscreen.

Information obtained about the consumer can be from a number of different sources. This can include information voluntarily provided by the consumer, such as name, birth date, sex, marital status, address, occupation, schooling, number of children, hobbies, interests, etc. Information about the consumer can also include behavioral data, for example, records of Internet shopping patterns, types of products or services purchased, and web sites frequently visited.

Rules database 56 serves as a repository for rules about using consumer information and consumer image information in order to develop and offer products to the consumer. Subsequent description and examples of system workflow help to show more clearly the function of rules database 56 for determining how to generate products that will interest the consumer.

Figure 2:
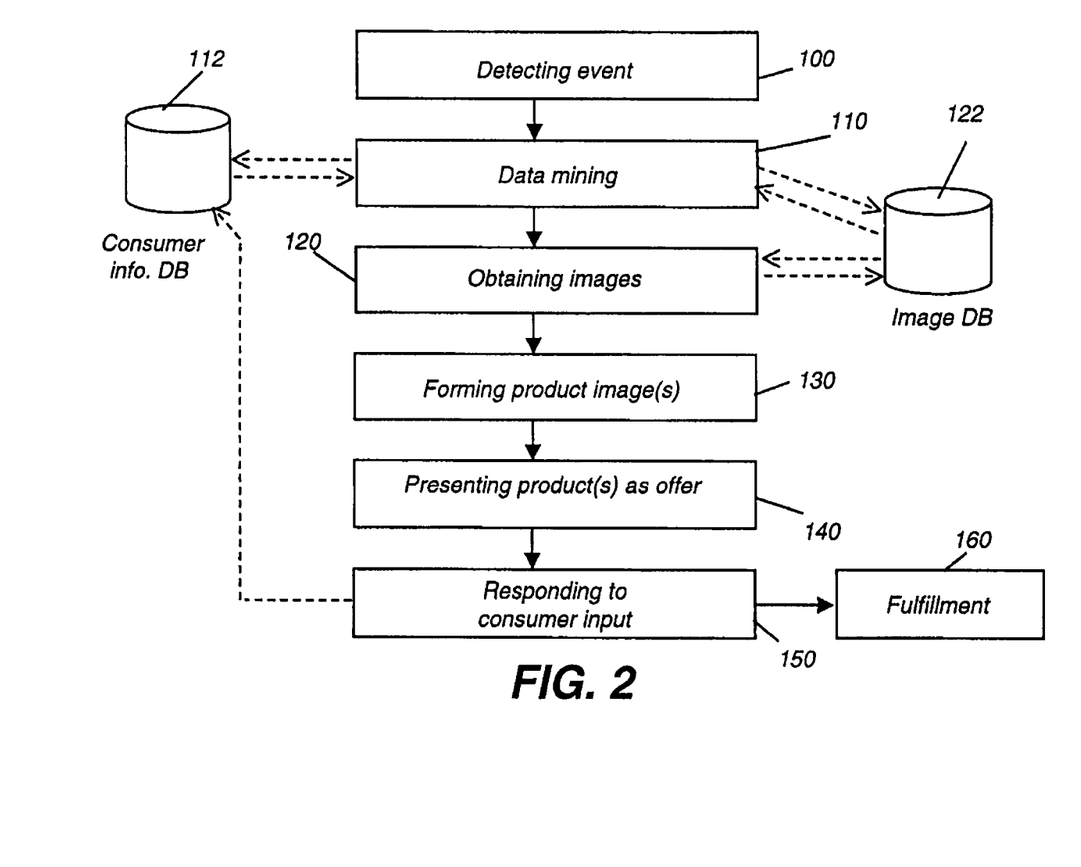
FIG. 2 illustrates a logic flow sequence for basic steps of a workflow for generating and offering products to the consumer using this system.

From a user perspective, retail system 10 automatically generates products for a user based on user profile information and stored images and related semantic information. FIG. 2 illustrates a simplified logic flow sequence for basic steps of a workflow for generating and offering products to the consumer using this system.

In FIG. 2, an event detection step 100 is triggered by some event detected by control logic. This can be as simple as an automatic response to the time of year or upcoming holidays. For example, an event can be a first consumer access to the PSP account after October $15^{th}$, after which date a personalized calendar might be of interest. A birthdate or other known date from the consumer profile can also act as a triggering event. The consumer can actively trigger the event, such as by clicking on a tab or special on-screen control when accessing the PSP account, such as the consumer's on-line gallery. The event can alternately be generated solely by a vendor, such as in an attempt to promote a special offer for an item, for example.

Next consumer data is obtained 110. During this step, various information about the targeted consumer is obtained. A consumer information database 112, as shown in the flow diagram of FIG. 2, is an abstraction for any number of databases or information sources that are available on a consumer account. As noted earlier, information in consumer information database 112 can include data voluntarily provided by the consumer or shopping behavior patterns or preferences learned from previous transactions with the consumer. Consumer information may also be obtained from third party marketing organizations, such as Amazon.COM, that have extensive product catalogs and are likely to serve consumers who also use on-line image storage.

An obtain consumer images step 120 is then executed. This step obtains images from a consumer image database 122, such as that managed by the PSP or other image database that is property of the consumer or often viewed by the consumer. For example, consumer image database 122 may be owned by one member of a family, with permissions for access extended to any number of other members. Thus, for example, consumer image database 122 for a family may be accessed often by a grandparent. As part of the obtain consumer images step 120, information on images viewed most frequently can be obtained from consumer image database 122, thereby identifying images that might be most pleasing if provided on a calendar, coffee mug, or other personalized item. Obtain consumer images step 120 can obtain a full-resolution image, or, for the sequence that follows, may use a thumbnail version of the full-resolution in order to save processing time.

Similarly, as another basis for access to the consumer information database 112, a vendor may request permission to use particular images for construction of a product to be offered to the consumer. This can occur without access to the image file. For example, if image-specific information is included in the consumer information database 112, the vendor may detect that the image specific information indicates that a good match exists between the images in question and the product the vendor wishes to populate with the images. For example, if the image specific information in the consumer information database 112 specifies that the content of a particular image is related to Halloween or that the date of capture is the thirtyfirst of October, the vendor can query the user to grant permission for access to the image at appropriate resolution so that the product, in this case an image bearing template with a pumpkin theme, can be rendered using the consumer image. In this case, the vendor need not have access to images unless the consumer approves that access for specific images.

Once a needed number of consumer images have been obtained, a forming product image step 130 can then be executed. In this step, images representing one or more products are generated for display using the consumer images that have been obtained. This can then be used in a subsequent step for providing an offer to the customer. For example, for a calendar, a number of images from the customer collection can be used and shown in calendar form for some or all months of the calendar year. As another example, the image of a desktop ornament, poster, or coffee mug image can be generated for display to the consumer.

In a product presentation step 140, the image formed in the forming product image step 130 is presented to the consumer as an offer for a personalized image-bearing product. Product presentation step 140 can operate by sending an email to the consumer, in which the email includes the images formed in forming product image step 130 or where the email has a link to a site that contains images of the available product. Optionally, product presentation step 140 can be executed when the consumer enters an online gallery account, such as by displaying a pop-up window or an animated icon or other attention-getting feature. As yet another option, product presentation step 140 can be initiated whenever the consumer clicks on a tab or control button when in an on-line gallery account.

A response-handling step 150 is then executed once the consumer response has been obtained. Information about the consumer response can then be fed back to consumer information database 112 as shown or can be otherwise stored for future use. A positive consumer response may then generate a sales order in a subsequent fulfillment step 160. In this step, the personalized image-bearing product that has been offered and ordered on line is manufactured and shipped or otherwise transmitted to the consumer. It can be observed that a product offering can be made by proxy, so that the ultimate source of a personalized image-bearing product is not disclosed, but is rather sold through an intermediary. The proxy may or may not have knowledge of the user or user preferences. The proxy can have other knowledge, such as knowledge of market trends or conditions that may be applied for more than one consumer. For example, a current event or popular theme of general interest might be used by the proxy for making a product offering.

The consumer response can be to request the use of a different image or to crop or otherwise treat the image that has been selected. In this way, a customer can be urged to participate in generating a personalized product, improving on the system's "best guess" as to which stored image would be most preferable for forming the desired product. As yet another option, the consumer can choose to upload a new image to the server and to use the new image for generating the personalized image-bearing product. In this way, the consumer can further define the offer, changing the image content without changing the type of product that has been offered.

As part of fulfillment step 160, a high-resolution image may be obtained for generating the final product. Generally, for on-screen display of a product generated for a particular user, low-resolution images suffice. For generation of the final product, higher resolution images may be needed, depending on the item that is produced. For example, a calendar image can require that the high-resolution image be obtained; a coffee mug may not require any more than a thumbnail image. The high-resolution image itself can be stored on the user computer 14$a$, 14$b$, 14$c$ (FIG. 2) or may be available for downloading from an image server.

The control logic for execution of the workflow sequence shown in FIG. 2 can be executed on any of the servers 22, 32, 42, or 52 of FIG. 1 or can be executed on a client computer 14$a$, 14$b$, or 14$c$, as well as on different cooperating processors interconnected along the network of internet 12. This process is executed according to rules that dictate how one or more of the individual steps can be carried out.

Rules

Rules that govern the logic steps shown in FIG. 2 can be of a variety of types. These rules are generally based on probabilistic logic, making some assumptions about the consumer and about consumer images that have at least a reasonable likelihood and conditioned by user preferences, either explicitly requested or implicit in on-line user behavior. In event detection step 100, for example, rules can be used to initiate or advance event detection, including rules that may not be specific to a user but can more generally reflect the behavior of multiple users. For example, media attention could provide input to a rule, so that current Olympic or sporting events could serve as triggers for offering various types of personalized items with sports themes to any consumer, without regard to age, sex, hobbies, or other data available in the consumer information database 112. In obtain consumer data step 110, one or more rules could be applied for identifying which consumers may be interested in a particular product or service, based on probabilistic inference. For example, rules may apply logic that provides some product offerings to consumers age 35 and younger, others to those only over the age of 35. In obtain consumer images step 120, rules may dictate that images having certain or similar content be grouped together for presentation of a personalized product. For example, where a predominant number of consumer images appear to have horses in them, one or more rules may be used to identify this type of behavior and determine the level of consumer interest in one type of product or another, based on this behavior.

Consumer preferences may also condition rules regarding what types of products the user would be interested in. For example, a consumer may only want image-bearing products that are soft-copy products and may want to prevent offering of products that would require mailing or shipping.

In forming product images as part of the forming product image step 130, rules may dictate that more expensive personalized image-bearing products are generated and shown first or last in a sequence. For the product presentation step 140, one or more rules can dictate that only a limited number of most likely products are presented at one time, thus helping to prevent the consumer from being confused by an excessive number of product choices.

Rules can be pre-programmed and provided with image management software packages or products such as Kodak EasyShare software that allow image storage and sharing. This arrangement gives the software distributor/manufacturer a significant amount of control over how rules are applied and could help to provide some ability to monitor age-appropriate content. In addition, this type of arrangement could also be used as a revenue channel, enabling a select group of on-line advertisers or on-line service companies to have access to consumer images and image data.

Rules can be dynamically generated for all users who access on-line image galleries or can be generated for specific groups of consumers only. Rules themselves can be stored in a rules database 56 that can be accessible only to a limited number of companies who are subscribers to this type of on-line marketing service. Optionally, rules can be downloaded to the user computer and applied to the organized collection of images and metadata for each individual user. A unique set of rules could be generated and stored as part of the user account for each user, helping to further individualize the marketing of imaging products to the on-line consumer.

Rules can also be updated as marketing promotions are developed for motion pictures or other high-visibility media events. For example, personalized image-bearing products can be offered to every consumer who has or accesses an on-line image service and who has ordered a book, poster, or other item related to a currently released film.

Rules can specify the extent or length of time during which one or more products are available for purchase or how often to update existing products based on newly uploaded consumer images. Rules can also provide various threshold data that helps to make good decisions about what products to offer the consumer. For example, a certain number of pictures of skiing may be above or below a threshold for generating an offer for a personalized ski booklet. Rules can change in weight with times of the calendar year, photo activity, detected subject matter, or other factors.

Rules for image selection can use a number of criteria. For example, it can be possible to detect the number of times a consumer has viewed a particular image or images of a particular subject, as well as to track the amount of time that has been spent viewing one or more specific images or images that appear to contain the same subject. Thus, rules can be developed that help to determine which image to obtain from a large collection of images and can rank multiple images according to their apparent appeal to the consumer.

Rules can stipulate predetermined relevance thresholds that apply for making selections of various types. Relevance thresholds may indicate number of times an image is accessed or may use more sophisticated metrics, such as image analysis that detects the type or types of subject that are of most interest to a particular consumer. The predetermined relevance threshold may be changed in response to a user setting or stated interest preference or, optionally, may be set by the provider of a product offering. Relevance thresholds may be applied to any number of variables stored in the consumer information database 112 or its equivalent.

Product Wizard

Figure 3:
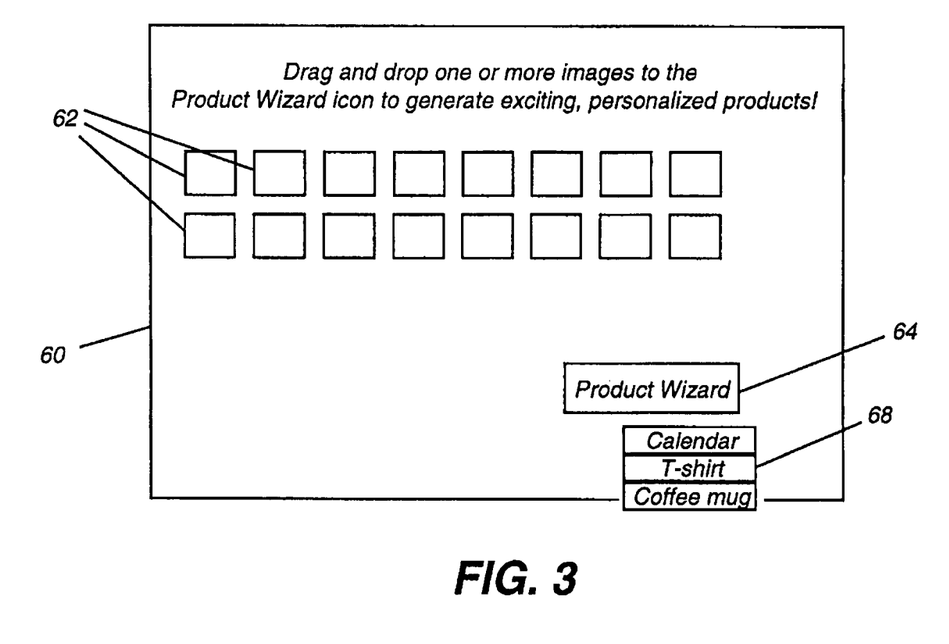
FIG. 3 is a plan view of an operator display for use of a product wizard to generate personalized image-bearing products in another embodiment.
Figure 4:
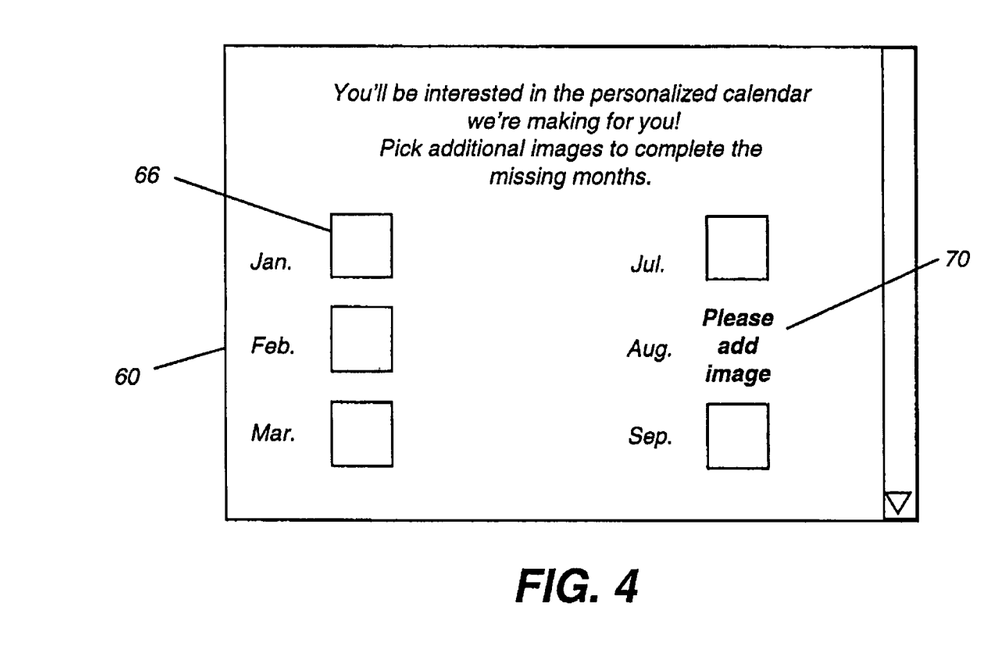
FIG. 4 is a plan view of an operator display showing components of a partially completed image-bearing product.

Rules for generating a personalized image-bearing product can also be invoked using a program or utility such as a product wizard at a consumer workstation, such as user computer 14*a*, 14*b*, or 14*c* in FIG. 1. In the example of FIGS. 3 and 4, generation of a product using consumer images selected by a user on a computer screen display 60 is shown. Here, the user can drag and drop one or more image thumbnails 62 onto a product wizard icon 64 in order to have a product generated. Dragging one or more thumbnails 62 onto wizard icon 64 can generate a selection menu 68 that provides a number of selections for forming various products using the selected image. For the simplified example of FIGS. 3 and 4, the consumer selects the option to form a calendar from the specified images. In display 60 of FIG. 4, thumbnails 66 are presented. Following consumer drag-and-drop selections, or, alternately, touchscreen or other selection techniques, thumbnails 66 show what images were specified and how they will be used in forming a personalized image-bearing product. A message 70 may be displayed to alert the consumer that one or more additional images will be necessary for completing the specified product.

Rules for forming a personalized image-bearing product can stipulate that a certain number of consumer images are necessary in order to form the product. For example, the calendar shown in the sequence of FIGS. 3 and 4 requires twelve images be obtained. When images are obtained manually, the operator may be able to display interim information on the progress towards forming the complete product, as in the example of FIG. 4. When images are obtained automatically, selection criteria given in rules for forming the product might not be satisfied. In such a case, it is possible for the system to form and display a partial product that does not have all of the needed images, but at least partially represents the intended final product that will be generated when all of the necessary images are obtained. This partial product can be displayed as part of product presentation step 140 (FIG. 2), along with instructions for obtaining and uploading the necessary images, or for using another existing image.

In one embodiment, a number of possible products are available for the consumer, based on images stored in consumer image database 122. The listed products may include some that are only partially complete; other products may be able to be generated without the added effort of providing additional figures or other information. Red, green, or blue icon indicators are provided by each listed product as keys to how much additional information might be needed, or how many images would need to be obtained in order to generate each personalized image-bearing product for a consumer.

Figure 5:
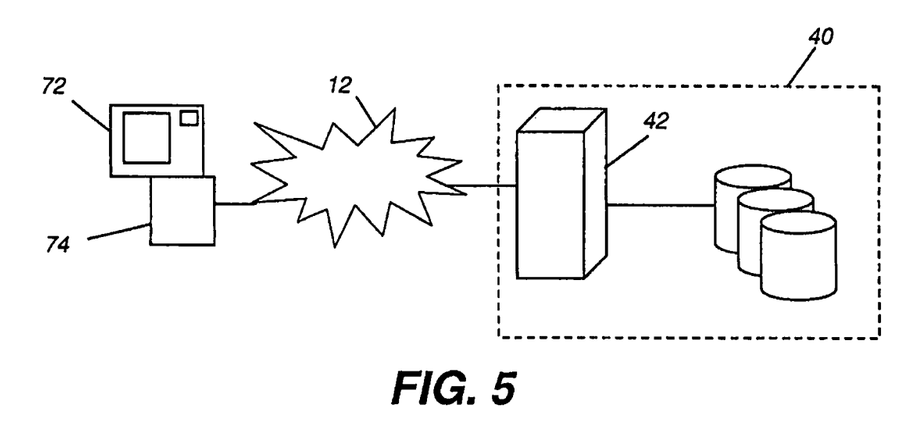
FIG. 5 illustrates an image capture device used by the consumer cooperating with a system in order to obtain suitable images for generating a particular personalized image-bearing product.

FIG. 5 illustrates an image capture device used by the consumer cooperating with a system in order to obtain suitable images for generating a particular personalized image-bearing product. It can be possible to form a partial product using images stored by the consumer because one or two more images is necessary. In such a case, retail system 10 may transmit a message to the digital camera or camera enabled cell phone, with instructions to display a suggestion message to the camera user for obtaining another image that is suitable. Referring to the schematic block diagram of FIG. 5, for example, server 42 at server site 40 executes the rules and logic for generating a calendar that is likely to be of interest to a consumer who takes many pictures of a skiing activity, as determined by image analysis assessment of the consumer image database 122 (FIG. 2). In preparing a calendar, however, server 42 identified only eleven suitable images for a calendar. Other images in the consumer image database 122 were repetitious, as determined by the image analysis software. A message is sent to a digital camera 72 that belongs to the same consumer, indicating the need for two additional skiing images. The consumer can view these messages and either choose to ignore them or continue to capture images in order to satisfy the request. Digital camera 72 can tag these images when obtained, so that they can be properly handled the next time network connection to camera 72 is established. When digital camera 72 is restored to a dock 74, the newly obtained images are uploaded to consumer image database 122 and can then be used by server 42 to complete its work on the partially complete calendar.

Note that prompts to the consumer can be loaded into the camera any time the camera is in contact with a networked node, such as the aforementioned dock 74, that is capable of connecting with the system that has created the partial product. In this manner, the system can also prompt the consumer to capture images for an event driven image-bearing product that may be partially complete, or fully incomplete. For example, the system may prompt the consumer to capture an image suitable for a Holiday card when a particular date ahead of the holiday, such as November 5 for example, is reached.

Some measure of security and consumer preference can also be provided. For example, retail system 10 may not automatically be granted permission to all databases and consumer information that is available from various Internet sites. Vendors may be reluctant or unable to provide recent purchase information relative to a particular consumer without the consumer's approval. For consumer workstation applications, use of the product wizard icon 64 as illustrated in FIG. 3 can include an authorization request to obtain information about consumer purchases from one or more Internet sites.

Information may also be provided interactively by a merchant. For instance, customer preference items like color choices, brand name preferences, shopping strategies (bargain hunter vs. "price is no problem" shopper) or other data can be stored in a database that is accessible for this user.

In addition to images that are obtained from consumer image database 122, other image content can be used to generate one or more personalized image-bearing products for a consumer. This image content can be from a specialized-interests database, not specific to any user (such as family photos) but usable for any user whose profile seems to indicate certain interests. For example, where consumer images appear to include boats and lake or ocean scenes, a background or frame material of nautical maps and instruments may be provided around consumer images. For a hiking enthusiast, topographical map symbols may be provided as a type of background that is suitable for a coffee mug or T-shirt having images for the consumer.

Differing levels of access to information in consumer information database 112 may be enabled according to consumer preferences. The consumer may be allowed to specify preferences that condition one or more access rules, such as rules indicating what information is available to different classes of interested parties. For example, very general information may be available to all vendors while specific information may be available to only preferred vendors, and even more specific information may only be available to friends and family. For example, in the case of information available in regard to a particular image, all vendors might be able to access information that specifies 4-year-old male child. A preferred vendor can access more specific information, such as 4-year-old male child birthday on Jul. 15, 2007 at 3 PM. Friends and family can access the most specific information: 4-year-old male child Bobby, birthday on Jul. 15, 2007 at 3 PM at Keuka Lake, Grandma's house.

The system and method of the present invention provide merchandisers with additional tools for obtaining business from consumers who make their images available on the Internet. It enables different vendors to share information that can be effective in profiling a consumer and in deciding what products to offer the consumer based on image preferences.

The invention has been described in detail with particular reference to certain preferred embodiments thereof, but it will be understood that variations and modifications can be effected within the spirit and scope of the invention. For example, the architecture of retail system 10 in FIG. 1 is exemplary and any number of networked arrangements are possible for obtaining consumer profile data and consumer images and for generating and presenting one or more products to the imaging consumer using those images. The system in FIG. 1 is represented as a fully networked system using the consumer's personal computer, but other arrangements would be possible, such as operation from a retail kiosk, for example. In this way, a consumer accessing an imaging account can be presented with an image of a product that can be produced in-house, eliminating the waiting time for product shipment and shipment costs.

The sequence of steps shown in FIG. 2 are also given by way of example and are not intended to be taken as limiting.

With reference to FIG. 2, it can be appreciated that the triggering event in step 100 can be considered broadly and need not be based on any explicit activity of the consumer. Any number of products can be presented to the consumer; ideally the product views that are provided include the consumer image or images. Thus, for example, where the product offered is a coffee mug, the system generates a "mock-up" of the final product for viewing by the consumer, with the image it intends to use. Sophistication could be provided where, for example, the consumer can examine the virtual "product" from more than one angle.

Thus, what is provided is a system and method for presenting image-bearing products to a consumer, customized with images of interest to the consumer.

PARTS LIST

| | |
|---|---|
| 10. | Retail system |
| 12. | Internet |
| 11a, 11b, 11c | Consumer site |
| 14a, 14b, 14c. | User computer |
| 16a, 16b, 16c. | Database |
| 20, 30, 40, 50. | Server site |
| 22, 32, 42, 52. | Server |
| 26 | database |
| 54. | Application provider |
| 56. | Database |
| 60. | Display |
| 62. | Thumbnail |
| 64. | Wizard icon |
| 66. | Thumbnail |
| 68. | Menu |
| 70. | Message |
| 72. | Camera |
| 74. | Dock |
| 100. | Event detection step |
| 110. | Obtain consumer data step |
| 112. | Consumer information database |
| 120. | Obtain consumer images step |
| 122. | Consumer image database |
| 130. | Forming product image step |
| 140. | Product presentation step |
| 150. | Response handling step |
| 160. | Fulfillment step |

The invention claimed is:

1. A method comprising:

accessing a plurality of image files from a picture service provider using a computer-readable storage medium, wherein the plurality of image files are photographs;

separating the plurality of image files into one or more groups of images based on detection of matching subject matter in the plurality of image files;

determining, by a computer processor, that a level of consumer interest in a first product meets a predetermined relevance threshold for a first matching subject matter of a first group of images from the one or more groups of images, wherein the determination is based on at least calculating a number of times at least one image containing the first matching subject matter has been accessed;

selecting the first product based on the determination;

generating an offer for a customized image-bearing product of the selected first product, wherein the customized image-bearing product uses at least one image from the first group of images; and causing transmission of the offer.

2. The method of claim 1, further comprising analyzing each image file of the plurality of image files to obtain semantic information about subject matter content of each image file.

3. The method of claim 2, further comprising determining image preferences of a user from the semantic information.

4. The method of claim 3, wherein the subject matter content of at least one of the plurality of image files directs the image preference to a specialized interest of the user.

5. The method of claim 2, further comprising identifying product preferences based on the determined image preferences.

6. The method of claim 2, wherein the generating the offer comprises generating the offer according to one or more rules associated with the determined image preferences.

7. The method of claim 1, further comprising providing access to image files of interest to a preferred product vendor.

8. The method of claim 1, wherein the transmitting the offer comprises transmitting the offer to a user device via a proxy.

9. The method of claim 1, wherein the picture service provider comprises an image capture device.

10. The method of claim 1, wherein the picture service provider comprises a server.

11. A system comprising:
a memory; and
a processing system coupled to the memory, wherein the processing system is configured to execute instructions stored at the memory to perform operations comprising:
accessing a plurality of image files from a picture service provider, wherein the plurality of image files are photographs;
separating the plurality of image files into one or more groups of images based on detection of matching subject matter in the plurality of image files;
determining that a level of consumer interest in a first product meets a predetermined relevance threshold for a first matching subject matter of a first group of images from the one or more groups of images, wherein the determination is based on at least calculating a number of times at least one image containing the first matching subject matter has been accessed;
selecting the first product based on the determination;
generating an offer for a customized image-bearing product of the selected first product, wherein the customized image-bearing product uses at least one image from the first group of images; and
causing transmission of the offer.

12. The system of claim 11, wherein the operations further comprise analyzing each image file of the plurality of image files to obtain semantic information about subject matter content of each image file.

13. The system of claim 12, wherein the operations further comprise determining image preferences of a user from the semantic information, and wherein the subject matter content of at least one of the plurality of image files directs the image preference to a specialized interest of the user.

14. The system of claim 12, wherein the operations further comprise identifying product preferences based on the determined image preferences.

15. The system of claim 12, wherein the generating the offer comprises generating the offer according to one or more rules associated with the determined image preferences.

16. The system of claim 11, wherein the operations further comprise providing access to image files of interest to a preferred product vendor.

17. The system of claim 11, wherein the picture service provider comprises an image capture device.

18. The system of claim 11, wherein the picture service provider comprises a server.

19. A non-transitory computer-readable medium having instructions stored thereon that, upon execution by a computing device, cause the computing device to perform operations comprising:
accessing a plurality of image files from a picture service provider, wherein the plurality of image files are photographs;
separating the plurality of image files into one or more groups of images based on detection of matching subject matter in the plurality of image files;
determining that a level of consumer interest in a first product meets a predetermined relevance threshold for a first matching subject matter of a first group of images from the one or more groups of images, wherein the determination is based on at least calculating a number of times at least one image containing the first matching subject matter has been accessed;
selecting the first product based on the determination;
generating an offer for a customized image-bearing product of the selected first product, wherein the customized image-bearing product uses at least one image from the first group of images; and
causing transmission of the offer.

20. The non-transitory computer-readable medium of claim 19, wherein the operations further comprise:
analyzing each image file of the plurality of image files to obtain semantic information about subject matter content of each image file;
determining image preferences of a user from the semantic information, wherein the subject matter content of at least one of the plurality of image files directs the image preference to a specialized interest of the user;
identifying product preferences based on the determined image preferences; and
wherein the generating the offer comprises generating the offer according to one or more rules associated with the determined image preferences and the identified product preferences.

* * * * *